UNITED STATES PATENT OFFICE.

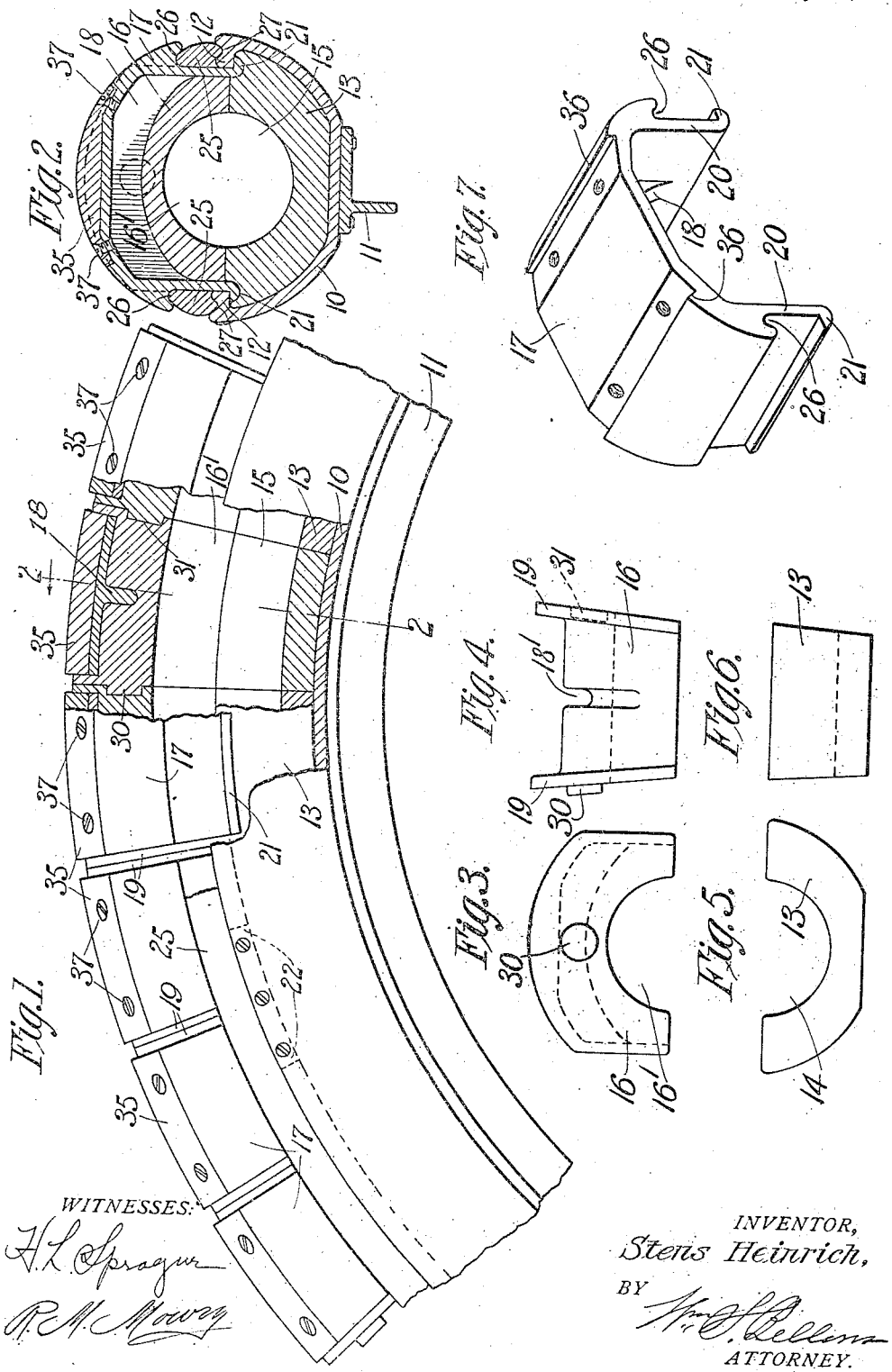

STENS HEINRICH, OF DIFFERDINGEN, GERMANY.

TIRE FOR VEHICLE-WHEELS.

998,966.

Specification of Letters Patent. Patented July 25, 1911.

Application filed December 10, 1910. Serial No. 596,608.

*To all whom it may concern:*

Be it known that I, STENS HEINRICH, a German subject, and resident of Differdingen, in Luxemburg, Germany, have invented certain new and useful Improvements in Tires for Vehicle-Wheels, of which the following is a full, clear, and exact description.

This invention relates to tires for automobiles, trucks and the like, and it has for one of its objects the provision of a tire consisting of a number of independent sections which may be assembled within the rim of a wheel, and locked in position therein, while at the same time such sections may be removed from the rim of the wheel, when desired.

The invention has, furthermore, for its object the provision of a tire in which a great amount of resiliency may be maintained while the outer tread of the tire may be formed of very hard substance, such as steel, this material being employed in what may be termed shoes which are applied to the tire-sections, above mentioned, individually.

Further objects of the invention will hereinafter appear and the means of their attainment be particularly pointed out in the claim.

The invention has been clearly illustrated in the accompanying drawings in which similar characters denote similar parts, and in which—

Figure 1 represents a side view of a fraction of the wheel rim with several of the tire-sections in place thereon. Fig. 2 is a cross section on line 2, 2 of Fig. 1. Fig. 3 is an end view of the movable member which constitutes one part of each tire-section. Fig. 4 is a side view thereof. Fig. 5 represents an end view of one of the stationary members which constitutes another portion of each tire-section and which is located within the rim of the wheel. Fig. 6 is a side view thereof and Fig. 7 is a perspective view of a cap which also constitutes one of the tire-sections.

The rim of the wheel to which my improved tire may be applied, may be of any suitable shape or cross-section, and in the present instance it consists of a continuous trough 10 preferably formed of steel and having an annular angle-plate 11 secured thereto, constituting a means whereby the spokes of the wheel may be held in position relatively to the rim. The outer edges of the trough or rim 10 have inwardly projecting annular lips 12 which constitute means for holding the several caps of the tire-sections in place.

Each tire-section comprises a resilient or cushion member 13 made of soft rubber and preferably having its central portion cut away as at 14 to form one-half of a hollow bore indicated by 15 in Fig. 2, and projecting under the lips 12 of the rim 10. Coöperative with the cushion-member 13 is an outer resistance member 16 also made of rubber and cut away as at 16', so that when the members 13 and 16 are brought together with their flat surfaces, the bore 15 will be complete, and the two members together will act in the same manner as a cushion-tire of ordinary construction. In the present instance I make use of these cushion-members only for the purpose of acting as means for offering a resilient resistance to pressure exerted against the periphery of the wheel, without however subjecting the rubber surface to wear. By referring to Fig. 2, it will be seen that the upper cushion-member 16 is capped or inclosed in a cap indicated in a general way by 17 and having a rim 18 adapted to enter a groove 18' of the member 16, the latter being also provided with flanges 19, between which the cap 17 will fit, so that, therefore, any longitudinal shifting movement of the cap relatively to the member 16 will be avoided. The cap 17 has downwardly projecting projections 20 each of which is provided with outwardly projecting lips 21 adapted to engage the underside of the lips 12 above described, the entire organization being such that when the cushion-members 13 and 16 are in position in the rim 10, and the cap 17 is placed as shown in Fig. 2, considerable resistance is offered to the compression of the cushion-members, and at the same time the lips 21 are held in close and frictional contact with the lips 12. In order to assemble these parts within the rim 10, one of the lips 12 is cut away as indicated at 22 in Fig. 1 for a width sufficient to permit the lip 21 to pass therethrough after which the entire tire-section consisting of the cushion members 13 and 16, and the cap 17, may be pushed along within the rim 10 which latter is thus "loaded", and the several tire-sections are thus locked in position therein. If desired the cushion-members may be cemented so as to form an inclosed air-space as far as the bore 15 is concerned. After all the sections of which the tire is composed, are assembled within the rim, the opening 22 above described may be closed in any suitable manner to complete the rim and prevent any accidental displacement of the tire-sections.

Means are provided whereby dirt, etc., is prevented from finding its way between the tire-sections and the rim, these means consisting preferably of annular pads 25 made of some elastic material which may be compressed between the cap 17 and the wheel-rim 10 and may be held in place as for instance by grooves 26 provided in the cap 17, while the edges of the wheel-rim 10 are also grooved as at 27, so that consequently said members 25 will be retained in position and in close contact with both the rim and the cap and thus prevent moisture or dirt against entrance at those points.

By referring to Figs. 3 and 4, it will be seen that in the preferred form thereof shown each member 16 is provided at one side thereof with a projection 30 adapted to enter a recess (shown by dotted lines 31) in the next adjacent section, so that in this manner the several soft rubber sections 16 are substantially interlocked with each other, and if desired, these sections may be assembled so as to make them water and air tight at their point of junction.

The caps 17 being preferably made of a lower grade of cast metal, I deem it important to protect the real wear-sustaining surface thereof, and especially at the tread of the tire, this protection being afforded by shoes 35 fitted on the caps 17, as for instance between ledges 36 thereof and preferably held in place thereon as for instance by screws 37, so that, therefore, said shoes may be removed when worn and new ones may be substituted therefor, without in any way affecting any change in any one of the tire-sections themselves. On the other hand, it will be understood that if any one of the sections in its entirety is to be removed from the wheel rim, such act can be performed without difficulty.

In summarizing the construction of the tire, it will be seen that while the rim of the wheel may be of any well known construction heretofore employed, my improved sectional-tire may be adapted to suit the construction of the rim with perhaps very small modifications, and, furthermore, that each section as it travels over the ground, will offer a yielding resistance and spring for the wheel as a whole, so that, a wheel fitted out in the manner above described, possesses practically all the advantages of a pneumatic tire, without the disadvantages of a continuous cushion or solid rubber tire.

Many changes may be made in the particular formation of the several cushion-members and also in the particular means whereby these sections are held together and in place on the rim, without departing from the spirit of the invention, and I wish it also to be distinctly understood that I do not confine myself to the particular construction of the cushion member of the tire which latter may be made in one piece, if preferred, and which also may be made solid instead of having a hollow bore as above described, the solid construction being particularly applicable and advantageous in connection with tires for the heavier kind of vehicles, such as trucks, etc.

I claim:—

The combination with a wheel rim of channel form, the edges of which terminate in inturned lips, said rim having annular grooves formed in its upper faces between the inner edges of said lips and the outer edges of the rim, a series of independent caps of U-shape comprising transverse tread portions and inwardly extending side portions which terminate in out-turned lips which engage beneath the inturned lips of the rim, said caps having upon their outer sides hook-shaped extensions, annular pads of elastic material bearing between said hook-shaped extensions and the annular grooves of the wheel rim, a series of elastic cushioning members, each of said cushioning members having a transverse recess with a convex bottom formed substantially entirely across its outer face, transverse, curved ribs carried by said cap members and seated in said recess, and outwardly extending flanges 19 integral with the cushioning members, each of which abuts against the corresponding flange of an adjacent cushioning; said flanges projecting outwardly between the adjacent ends of the caps, and a wear resisting strip removably secured on each cap, substantially as shown and described.

Signed by me at Luxemburg in presence of two subscribing witnesses.

STENS HEINRICH.

Witnesses:
GEORG LEHMANN,
WILLY STEINFELD.